US012635010B2

(12) United States Patent
Takao et al.

(10) Patent No.: US 12,635,010 B2
(45) Date of Patent: May 19, 2026

(54) CONTROL DEVICE, TERMINAL, CONTROL METHOD, AND RECORDING MEDIUM

(71) Applicant: Panasonic Intellectual Property Management Co., Ltd., Osaka (JP)

(72) Inventors: Naoya Takao, Hyogo (JP); Hideki Fukuda, Nara (JP); Shota Kubo, Osaka (JP); Shiro Iwasaki, Osaka (JP); Tomoyuki Okada, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 329 days.

(21) Appl. No.: 18/688,281

(22) PCT Filed: Aug. 16, 2022

(86) PCT No.: PCT/JP2022/030929
§ 371 (c)(1),
(2) Date: Feb. 29, 2024

(87) PCT Pub. No.: WO2023/037830
PCT Pub. Date: Mar. 16, 2023

(65) Prior Publication Data
US 2024/0365402 A1 Oct. 31, 2024

(30) Foreign Application Priority Data
Sep. 8, 2021 (JP) ................................. 2021-146493

(51) Int. Cl.
*H04W 76/10* (2018.01)
*H04L 67/00* (2022.01)
*H04W 48/12* (2009.01)

(52) U.S. Cl.
CPC ........... *H04W 76/10* (2018.02); *H04W 48/12* (2013.01); *H04L 67/34* (2013.01)

(58) Field of Classification Search
CPC ....... H04W 76/10; H04W 48/12; H04W 4/80; H04W 4/50; H04W 84/12; H04W 84/10;
(Continued)

(56) References Cited

U.S. PATENT DOCUMENTS 9,445,054 B2 * 9/2016 Kato ................... H04N 1/00217
11,627,013 B2 * 4/2023 Kim ................. H04N 21/41407
709/208
(Continued)

FOREIGN PATENT DOCUMENTS

EP 2662738 A1 * 11/2013 ........... G05B 19/056
EP 3557936 B1 * 11/2020 .......... H04W 72/541
(Continued)

OTHER PUBLICATIONS

International Search Report dated Oct. 11, 2022 issued in International Patent Application No. PCT/JP2022/030929, with English translation.
(Continued)

*Primary Examiner* — Mahendra R Patel
(74) *Attorney, Agent, or Firm* — Rimon P.C.

(57) ABSTRACT
A control device includes a wireless IF that receives an identification signal wirelessly transmitted by an apparatus, an obtainer that refers to the identification signal received by the wireless IF, and obtains information indicating that software that manages the apparatus and operates on a terminal can be installed on the terminal, and a display controller that controls display of an image indicating the information obtained by the obtainer.

12 Claims, 11 Drawing Sheets

FIG. 2

(58) Field of Classification Search
CPC ...... H04W 88/02; H04W 88/06; H04L 67/34;
G08C 2201/93; G08C 17/02; H04N
21/4334; H04N 21/43637; H04N
21/4131; H04N 21/42204; G06F 8/61;
G06F 16/9554; H04M 1/72412; H04M
1/72415
USPC ......................................................... 370/310
See application file for complete search history.

(56) References Cited

U.S. PATENT DOCUMENTS

| | | | | |
|---|---|---|---|---|
| 2013/0027613 A1* | 1/2013 | Kim | | H04N 21/4316 |
| | | | | 348/563 |
| 2015/0003806 A1* | 1/2015 | Maeda | | H04N 5/765 |
| | | | | 386/234 |
| 2016/0175091 A1* | 6/2016 | Van Heugten | | A61F 2/14 |
| | | | | 623/6.22 |
| 2017/0322691 A1* | 11/2017 | Tokuchi | | H04N 1/32122 |
| 2018/0177031 A1* | 6/2018 | Yoo | | H04M 1/72415 |
| 2019/0306713 A1* | 10/2019 | Yanagisawa | | H04W 88/08 |
| 2025/0021290 A1* | 1/2025 | Jeong | | H04N 21/4363 |

FOREIGN PATENT DOCUMENTS

| | | | | |
|---|---|---|---|---|
| JP | 2019176451 A | * | 10/2019 | |
| WO | WO-2016013349 A1 | * | 1/2016 | G06F 3/1454 |

OTHER PUBLICATIONS

Extended European Search Report dated Jan. 3, 2025 issued in the corresponding European Patent Application No. 22867152.5.

* cited by examiner

S313

| Case | IEEE802.11a | IEEE802.11g |
|------|-------------|-------------|
| #1 | *-A- | *-G-**** |
| #2 | *****-a | *****-g |
| #3 | *5g-** | *2g-****** |
| #4 | ******-5G | ******-2G |

CONTROL DEVICE, TERMINAL, CONTROL METHOD, AND RECORDING MEDIUM

CROSS-REFERENCE OF RELATED APPLICATIONS

This application is the U.S. National Phase under 35 U.S.C. § 371 of International Patent Application No. PCT/JP2022/030929, filed on Aug. 16, 2022, which in turn claims the benefit of Japanese Patent Application No. 2021-146493, filed on Sep. 8, 2021, the entire disclosures of which Applications are incorporated by reference herein.

TECHNICAL FIELD

The present disclosure relates to a control device, a terminal, a control method, and a recording medium.

BACKGROUND ART

Patent Literature (PTL) 1 discloses a system in which connection information is input using a terminal when an apparatus (device) is connected to an access point through wireless communication.

CITATION LIST

Patent Literature

[PTL 1] Japanese Unexamined Patent Application Publication No. 2019-176451

SUMMARY OF INVENTION

Technical Problem

The present disclosure provides a control device and the like which promote installation of software managing an apparatus to an terminal.

Solution to Problem

The control device according to the present disclosure is a control device including: a first wireless interface that receives an identification signal wirelessly transmitted by an apparatus; an obtainer that refers to the identification signal received by the first wireless interface, and obtains information indicating that software that manages the apparatus and operates on a terminal can be installed on the terminal; and a display controller that controls display of an image indicating the information obtained by the obtainer.

Advantageous Effects of Invention

The control device according to the present disclosure promotes installation of software managing an apparatus to a terminal.

DESCRIPTION OF EMBODIMENT

Figure 1:
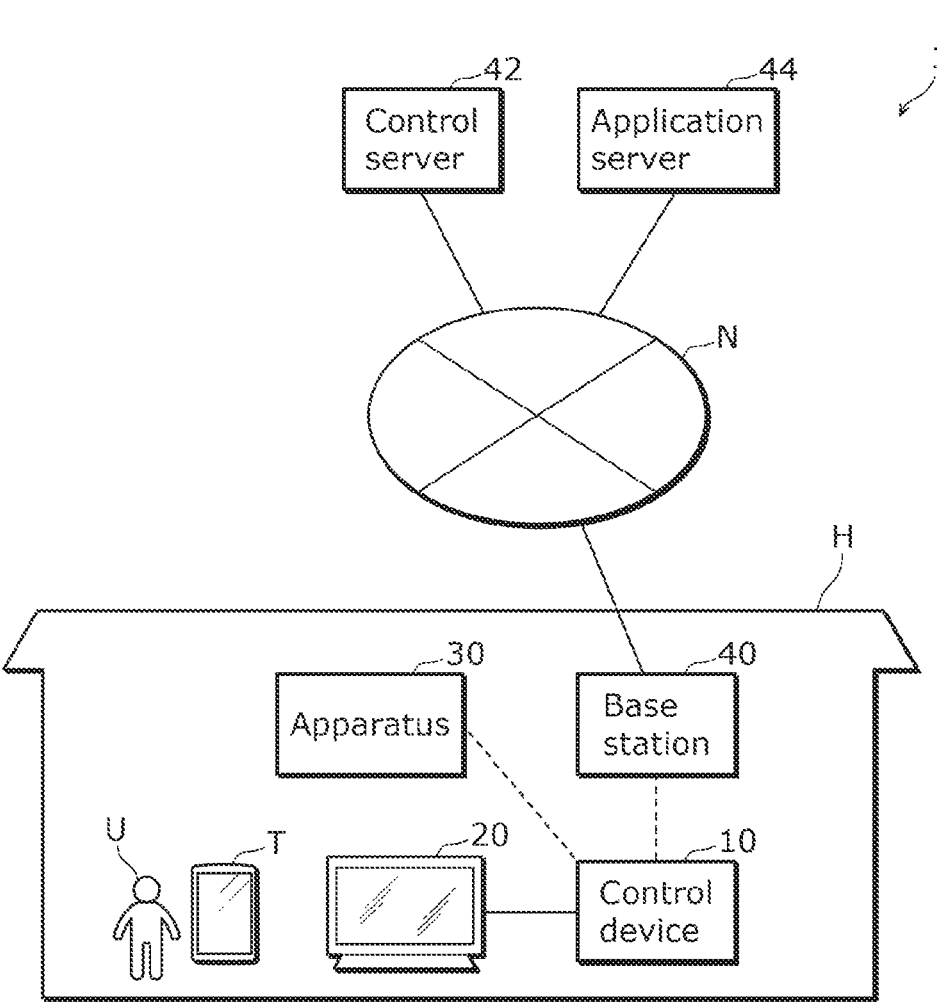
FIG. 1 is a block diagram schematically illustrating a configuration of a control system according to an embodiment.

Hereinafter, an embodiment obtained from the contents disclosed in this specification will be exemplified, and the effects and the like obtained therefrom will be described.

(1) A control device including: a first wireless interface that receives an identification signal wirelessly transmitted by an apparatus; an obtainer that refers to the identification signal received by the first wireless interface, and obtains information indicating that software that manages the apparatus and operates on a terminal can be installed on the terminal; and a display controller that controls display of an image indicating the information obtained by the obtainer.

According to the above aspect, by controlling the display of the image, the control device causes a user of the terminal to recognize that the software managing the apparatus can be installed on the terminal. Thereby, the user can be motivated to install the software managing the apparatus to the terminal, and perform the installation. Thus, the control device can promote installation of the software managing the apparatus to the terminal.

(2) The control device according to (1), in which the information includes notification information indicating that the software can be installed on the terminal, or an address of a site that provides the software.

According to the above aspect, the control device can cause the user to easily recognize that the software can be installed, by controlling the display of the image indicating the notification information, or can cause the terminal to easily access to the site by controlling the display of the image indicating the address of the site that provides the software. Thus, the control device can further promote installation of the software managing the apparatus to the terminal.

(3) The control device according to (1) or (2), in which the information includes an image readable by the terminal, the image indicating an address of a site that provides the software.

According to the above aspect, by reading the image, the terminal can know the address of the site that provides the software, and as a result, can more easily access to the site. In other words, the control device can cause the terminal to more easily access to the site. Thus, the control device can further promote installation of the software managing the apparatus to the terminal.

(4) The control device according to any one of (1) to (3), in which the display controller: (a) controls the display of the image on a display screen included in the control device; or (b) controls the display of the image on a display screen included in a display device connected to the control device.

According to the above aspect, the control device can cause the user to more easily view the displayed image by displaying the image on the display screen included in the control device or on the display screen included in the display device connected to the control device. Thereby, the user can be motivated to install the software managing the apparatus to the terminal. Thereby, the control device can more easily promote installation of the software managing the apparatus to the terminal.

(5) The control device according to any one of (1) to (4), in which the identification signal includes type information indicating a type of the apparatus, the obtainer obtains the information when the type information indicates that the apparatus is a non-display-control apparatus, the display controller controls the display of the image when the type information indicates that the apparatus is the non-display-control apparatus, and the non-display-control apparatus is an apparatus that is neither an apparatus including a display device nor an apparatus that is connected to a display device and displays an image on a display screen included in the display device.

According to the above aspect, when the apparatus is the non-display-control apparatus, the control device causes the user to recognize that the software managing the apparatus can be installed on the terminal. When the apparatus is the non-display-control apparatus, convenience in management of the apparatus can be improved by displaying the state of the apparatus in the terminal or by adjusting the information to be set in the apparatus on the terminal and then providing the information to the apparatus. Thus, the control device can promote installation of the software managing the non-display-control apparatus to the terminal.

(6) The control device according to any one of (1) to (5), in which the first wireless interface is communicably connected to a base station, and the control device further includes: a provider that provides connection information to the apparatus through the terminal by providing the connection information to the terminal in which the software is installed, the connection information being connection information for the first wireless interface to connect to the base station and being set in the first wireless interface.

According to the above aspect, the control device can cause the apparatus to connect to the base station by providing the connection information, which is used by the control device to connect to the base station, to the apparatus. Thus, the apparatus can be easily caused to connect to the base station without separately setting the connection information for the apparatus, and the apparatus can be managed through wireless communication. Thus, the control device can promote installation of the software managing the apparatus to the terminal, and further can manage the apparatus using wireless communication.

(7) The control device according to (6), in which the provider: converts the connection information to connection information in a communication standard of a second wireless interface included in the apparatus according to predetermined conversion rules; sets the connection information after conversion, in the first wireless interface, and determines whether the first wireless interface in which the connection information is set is successfully connected to the base station; and provides the connection information after conversion to the apparatus when it is determined that the first wireless interface is successfully connected to the base station.

According to the above aspect, the control device can cause the apparatus to connect to the base station by converting the connection information used by the control device to connect to the base station, and then providing the connection information to the apparatus. Thereby, when the communication standard of the wireless communication used by the control device to connect to the base station is different from that of the wireless communication used by the apparatus to connect to the base station, the apparatus can be caused to easily connect to the base station without separately setting the connection information for the apparatus, and the apparatus can be managed through wireless communication. Thus, the control device can promote installation of the software managing the apparatus to the terminal, and further can manage the apparatus using wireless communication.

(8) The control device according to any one of (1) to (7), in which the first wireless interface: receives the identification signal as a service set identifier (SSID) included in a beacon signal in a wireless LAN, or receives the identification signal as information included in a beacon signal in a Bluetooth Low Energy (BLE) network.

According to the above aspect, the control device can identify the apparatus using the information included in the SSID included in the beacon signal in the wireless LAN or in the beacon signal included in the BLE network as the identification signal of the apparatus. In other words, use of other information is unnecessary to identify the apparatus. Thus, the control device can identify the apparatus using the beacon signal, and can promote installation of the software managing the apparatus to the terminal.

(9) A terminal including a control device, in which the control device includes: a first wireless interface that receives an identification signal wirelessly transmitted by an apparatus; and an obtainer that refers to the identification signal received by the first wireless interface, and obtains information indicating that software that manages the apparatus and operates on the terminal can be installed on the terminal.

According to the above aspect, the same effects as those of the above-mentioned control device are obtained.

(10) The terminal according to (9), in which the first wireless interface is communicably connected to a base station, and the control device further includes a provider that provides connection information to the apparatus, the connection information being connection information for the first wireless interface to connect to the base station and being set in the first wireless interface.

According to the above aspect, the same effects as those of the above-mentioned control device are obtained.

(11) The terminal according to (10), in which the provider: converts the connection information to connection information in a communication standard of a second wireless interface included in the apparatus, according to predetermined conversion rules; sets the connection information after conversion, in the first wireless interface, and determines whether the first wireless interface in which the connection information is set is successfully connected to the base station; and provides the connection information after conversion to the apparatus when it is determined that the first wireless interface is successfully connected to the base station.

According to the above aspect, the same effects as those of the above-mentioned control device are obtained.

(12) A control method to be executed by a control device including a first wireless interface, the control method including: receiving an identification signal wirelessly transmitted by an apparatus in the first wireless interface; referring to the identification signal received in the first wireless interface, and obtaining information indicating that software that manages the apparatus and operates on a terminal can be installed on the terminal; and controlling display of an image indicating the information obtained.

According to the above aspect, the same effects as those of the above-mentioned control device are obtained.

(13) A non-transitory computer-readable recording medium having recorded thereon a program for causing a computer to the control method according to (12).

According to the above aspect, the same effects as those of the above-mentioned control device are obtained.

Hereinafter, an embodiment will be described in detail appropriately with reference to the drawings. To be noted, detailed descriptions beyond necessity will be omitted in some cases. For example, detailed descriptions of things already well known and overlapping descriptions of substantially identical configurations may be omitted in some cases. This is for avoiding unnecessarily redundant description below and facilitating understanding by persons skilled in the art.

The inventors provide the accompanying drawings and description below for sufficiently understanding the present disclosure by persons skilled in the art, and are not intended to limit the subject matter to the scope of CLAIMS by these.

EMBODIMENT

In the present embodiment, a control device that promotes installation of software managing an apparatus to a terminal will be described.

FIG. 1 is a block diagram schematically illustrating the configuration of control system 1 according to the present embodiment.

Control system 1 is a system that promotes installation of software to terminal T, the software managing apparatus 30 disposed in residence H of user U.

As illustrated in FIG. 1, control system 1 includes control device 10, display device 20, control server 42, and application server 44. Control system 1 may further include apparatus 30 and base station 40.

Apparatus 30 is an apparatus managed by the software installed on terminal T, and is, for example, a home appliance, and more specifically, is a laundry machine, an air conditioner, a refrigerator, a microwave oven, a television receiver (also referred to as television), a recording apparatus, or a front-door intercom. Apparatus 30 can be a non-display-control apparatus or a display-control apparatus. Here, the non-display-control apparatus is an apparatus that is neither an apparatus including a display device nor an apparatus that is connected to a display device and displays an image on a display screen included in the display device. The display-control apparatus is an apparatus including a display device or an apparatus that is connected to a display device and displays an image on a display screen included in the display device.

For example, apparatus 30 is an apparatus newly disposed in residence H by user U, and more specifically an apparatus that user U newly bought for use in residence H.

Base station 40 is a wireless LAN base station inside residence H of user U. The wireless LAN is a Wi-Fi (registered trademark) network, for example. This case will be described as one example, but any other configuration can be used.

Display device 20 is a display device including a display screen. Display device 20 displays an image on the display screen in response to control by control device 10.

Control server 42 is a server apparatus that provides information to promote installation of the software operating on terminal T to terminal T. Control server 42 is implemented by a computer.

Application server 44 is a server apparatus that has software operating on terminal T (generally, also referred to application software or a smartphone application. Application server 44 is implemented by a computer.

Control device 10 is a control device that promotes installation of software to terminal T, the software being software that manages apparatus 30 and operates on terminal T. Control device 10 is connected to base station 40 through wireless communication, and is connected to network N through base station 40 to be communicable with other apparatuses connected network N. Control device 10 controls display of an image on the display screen included in display device 20.

Control device 10 is a recording apparatus, for example, and this case will be described as one example. In this case, control device 10 controls display of an image on the display screen included in display device 20 (such as a television) connected to the recording apparatus with a video communication standard (HDMI (registered trademark)). The configuration of control device 10 will be described in detail later.

Control device 10 may include display device 20. In this case, it can be said that control device 10 includes a display screen. Control device 10 controls display of an image on the display screen included in control device 10. Control device 10 may be a television, for example.

Figure 2:
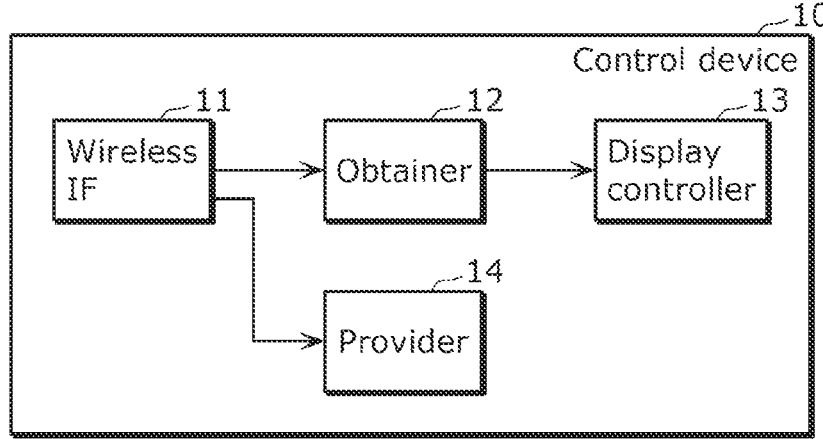
FIG. 2 is a block diagram illustrating a functional configuration of a control device according to the embodiment.

FIG. 2 is a block diagram illustrating a functional configuration of control device 10 according to the present embodiment.

As illustrated in FIG. 2, control device 10 includes wireless interface (wireless IF) 11, obtainer 12, display controller 13, and provider 14.

Wireless IF 11 is a communication interface which performs wireless communication, and includes an antenna and a wireless circuit. Wireless IF 11 receives an identification signal wirelessly transmitted from apparatus 30. Wireless IF 11 is also referred to as first wireless interface. For example, wireless IF 11 may receive the identification signal as a service set identifier (SSID) included in a beacon signal of the wireless LAN (specifically, Wi-Fi network). In other words, the identification signal may be included in the SSID. This case will be described as one example, but any other configuration can be used.

Wireless IF 11 performs wireless communication through one channel selected from N (where N is an integer of 2 or more) communication channels (also simply referred to as channels), and when not performing wireless communication, wireless IF 11 waits for reception of the identification signal to be transmitted from apparatus 30 while scanning N channels, and receives the identification signal. When the transmission channel as a channel through which apparatus 30 transmits the identification signal is predetermined, the proportion of the time or the number of times to wait for reception in the transmission channel in the total duration of the scanning by wireless IF 11 is greater than 1/N.

The time to wait for reception in the transmission channel in the scanning by wireless IF 11 may be the longest among the times to wait for reception in the N channels, or the number of times to wait for reception in the transmission channel in the scanning by wireless IF 11 may be the largest among the numbers of times to wait for reception in the N channels.

In the scanning, wireless IF 11 may alternately wait for reception in the transmission channel and in any channel of a plurality of channels excluding the transmission channel.

Wireless IF 11 may further include a wireless interface for near-field wireless communication. The communication standard for near-field wireless communication is, for example, Bluetooth (registered trademark) Low Energy (BLE), and this case will be described as one example. The BLE communication interface included in wireless IF 11 can be used when apparatus 30 is a display-control apparatus. In this case, wireless IF 11 may receive the identification signal as information included in the beacon signal in the BLE network.

Obtainer 12 is a functional portion that obtains information from control server 42. The functional portion included in control device 10 can be implemented by a processor included in control device 10 (such as a central processing unit (CPU) (not illustrated)), the processor executing a predetermined program using a memory (not illustrated). The same is applied to functional portions thereafter.

Specifically, obtainer 12 refers to the identification signal received by wireless IF 11, and obtains information indicating that the software that manages apparatus 30 and operates on terminal T can be installed on terminal T. For example, the information may include notification information indicating that the software can be installed on terminal T, or the address of the site which provides the software. The site is a web site written in hyper text markup language (HTML), for example, but not limited thereto. The information may include, for example, an image which indicates the address (or uniform resource locator (URL)) of the site providing the software and is readable by terminal T. The image is, for example, a two-dimensional code in which the address is encoded, and more specifically, is a QR code (registered trademark).

Display controller 13 is a functional portion that controls display of an image (also referred to as presentation image) on the display screen of display device 20. Display controller 13 obtains the presentation image from control server 42, and controls the display of the obtained presentation image.

When control device 10 includes display device 20 (in other words, control device 10 includes the display screen), display controller 13 controls the display of the presentation image on the display screen included in control device 10. When control device 10 is connected to display device 20, display controller 13 controls the display of the presentation image on the display screen included in display device 20 connected to control device 10.

Display controller 13 performs the control by providing a video signal to display device 20, the video signal indicating the image to be displayed on the display screen. Display device 20 to which the video signal is provided displays the presentation image on the display screen based on the provided video signal.

Provider 14 is a functional portion that provides information to apparatus 30. Provider 14 provides connection information for apparatus 30 to connect to base station 40 (in other words, connection information for apparatus 30 to connect to the wireless LAN). Provider 14 provides connection information to terminal T, the connection information being connection information for wireless IF 11 to connect to base station 40 and being set in wireless IF 11. Software for managing apparatus 30 is installed in terminal T. It is assumed that terminal T to which the connection information is provided provides the provided connection information to apparatus 30 in response to the operation of the software. Thus, provider 14 provides the connection information to apparatus 30 through terminal T.

When providing the connection information, provider 14 may convert the connection information according to predetermined conversion rules, and then provide the converted connection information to apparatus 30 through terminal T. Specifically, according to the predetermined conversion rules, provider 14 may convert the connection information set in wireless IF 11 to connection information in accordance with the communication standard of a wireless IF (second wireless interface) included in apparatus 30. In this case, provider 14 sets the converted connection information in wireless IF 11, and determines whether wireless IF 11 in which the connection information is set is successfully connected to base station 40. Then, when provider 14 determines that wireless IF 11 is successfully connected to base station 40, provider 14 provides the converted connection information to apparatus 30 through terminal T. Here, the predetermined conversion rules are conversion rules for IDs of the wireless LANs whose communication standards are different from each other, and more specifically, are conversion rules for converting the SSID of the Wi-Fi network as the wireless LAN to those in IEEE802.11a and IEEE802.11g. The conversion rules will be described in detail later.

Referring to the identification signal received by wireless IF 11, provider 14 communicably connects to apparatus 30, and provides setting information or position information needed for the operation of apparatus 30 to apparatus 30.

The identification signal transmitted by apparatus 30 may include type information indicating the type of apparatus 30. This case is described as one example. The type information includes at least information indicating that the type of apparatus 30 is a non-display-control apparatus or a display-control apparatus.

When the identification signal includes the type information and the type information indicates that apparatus 30 is a non-display-control apparatus, obtainer 12 obtains the above-mentioned information. When the type information indicates that apparatus 30 is a non-display-control apparatus, display controller 13 controls the display of the image.

When the type information included in the identification signal indicates that apparatus 30 is a display-control apparatus, provider 14 provides the setting information to apparatus 30.

When the identification signal is included in the SSID, for example, information (such as numerals, characters, or symbols) in a predetermined position within the SSID is used as the identification signal, and the information in the predetermined position in the identification signal is used as the type information. Obtainer 12 obtains the type information by extracting the information in the predetermined position in the identification signal.

The identification signal may further include the category (the type such as a laundry machine, an air conditioner, a refrigerator, a microwave oven, a television, or a recording apparatus) or version information of apparatus 30. In this case, the information (such as numerals, characters, or symbols) in the predetermined position in the identification signal is used as a product category, and is used as the version information. Obtainer 12 obtains the product category and the version information by extracting the information in the predetermined position in the identification signal.

The processing of control device 10 having such a configuration above will be described in detail.

Figure 3:
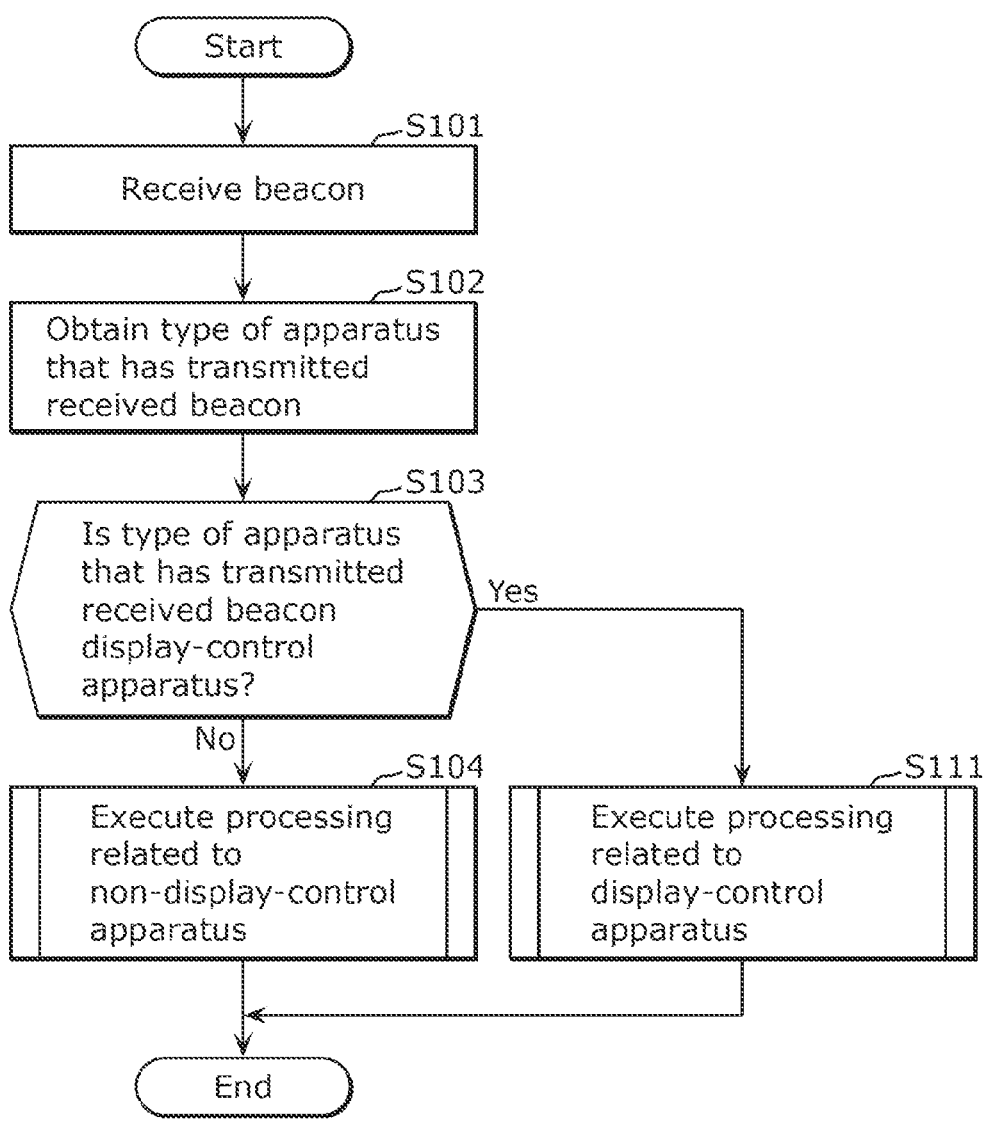
FIG. 3 is a flowchart illustrating processing to be executed by the control device according to the embodiment.

FIG. 3 is a flowchart illustrating processing to be executed by control device 10 according to the present embodiment. The flowchart illustrated in FIG. 3 represents a flow of processing from finding of apparatus 30 by control device 10 to execution of the processing related to apparatus 30 according to the type of apparatus 30 found. The flowchart illustrated in FIG. 3 may be repeatedly executed by control device 10.

In step S101, wireless IF 11 in control device 10 waits for reception of the beacon while scanning the channels, and receives the beacon. It is assumed that this beacon is the beacon transmitted by apparatus 30. For example, apparatus 30 transmits the beacon at a predetermined interval (e.g., an interval of 100 milliseconds) for a predetermined time (e.g., for 15 minutes) after the power supply is turned on.

In step S102, obtainer 12 in control device 10 extracts the type information included in the beacon received in step S101, and obtains the type of apparatus 30 that transmits the beacon.

In step S103, obtainer 12 in control device 10 determines whether the type of apparatus 30 obtained in step S102 is a display-control apparatus. When it is determined that the type of apparatus 30 is a display-control apparatus (Yes in step S103), the processing goes to step S111. If it is not the case (No in step S103), the processing goes to step S104.

In step S104, control device 10 executes the processing related to the non-display-control apparatus. The detailed processing included in step S104 will be described later.

In step S111, control device 10 executes the processing related to the display-control apparatus. The detailed processing included in step S111 will be described later.

After step S104 or step S111 is completed, a series of processings illustrated in FIG. 3 is terminated.

By the series of processings illustrated in FIG. 3, control device 10 executes the processing related to the type according to whether apparatus 30 is a display-control apparatus or a non-display-control apparatus.

Figure 4:
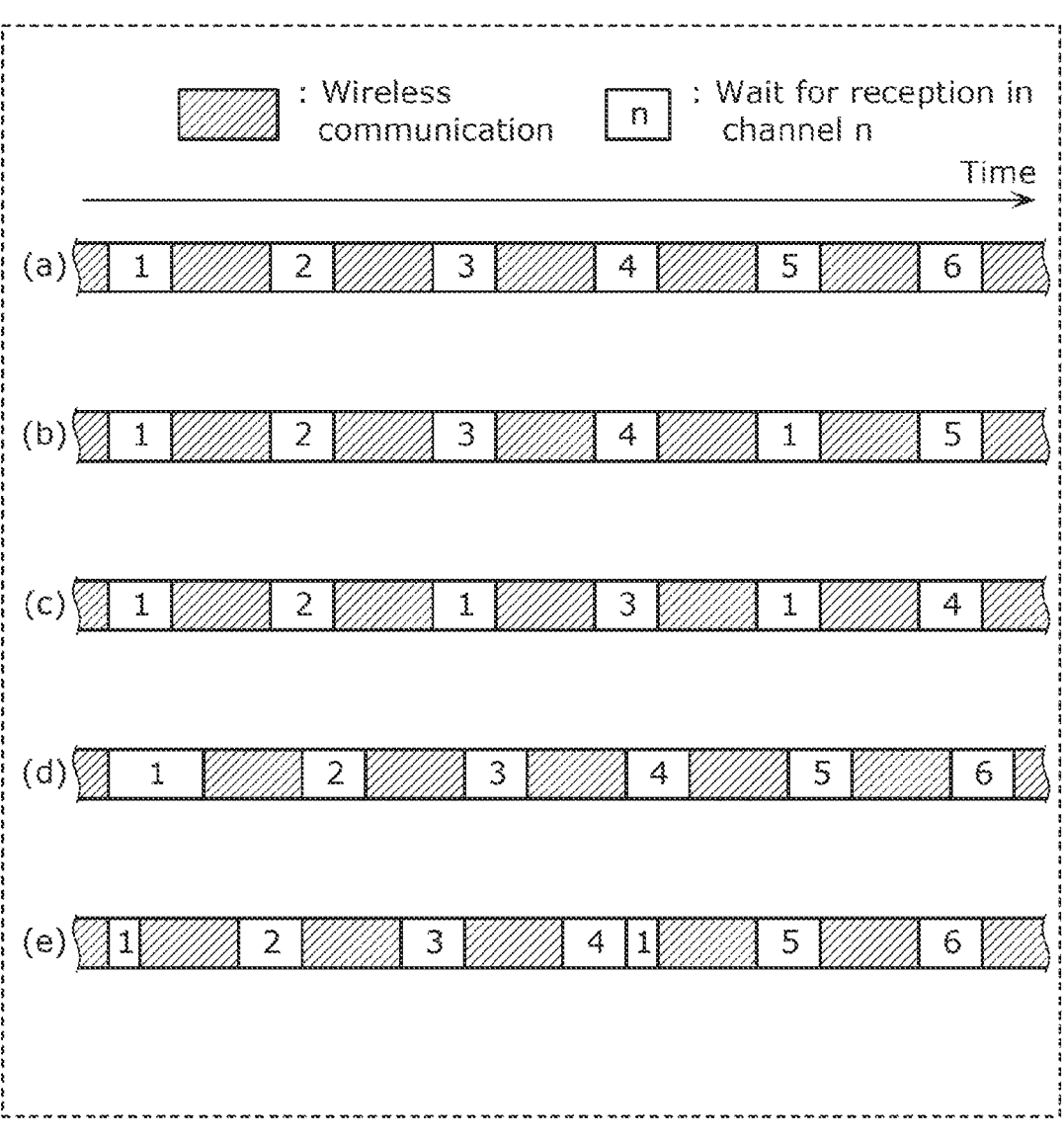
FIG. 4 is a diagram illustrating a method of scanning channels by the control device according to the embodiment.

FIG. 4 is a diagram illustrating a method of scanning channels by control device 10 according to the present embodiment. The scanning method illustrated in FIG. 4 can be used when control device 10 receives the beacon (see step S101 in FIG. 3).

Here, the case where wireless IF 11 has 1 to 13 communicable channels and the number N of channels is 13 will be described as one example. The transmission channel that is the channel through which apparatus 30 transmits the identification signal is defined as channel 1.

(a) illustrated in FIG. 4 indicates one example of the method of scanning by a control device in Comparative Example, and (b) to (e) indicate the methods of scanning by control device 10. In FIG. 4, the abscissa represents time. In FIG. 4, hatched rectangles each indicate a period during which wireless communication is performed (also referred to as communication period), and non-hatched rectangles with a numeric value each indicate a period of reception (reception period) in the channel indicated by the numeric value. In other words, the control device performs wireless communication in the communication period, and waits for reception in the reception period during which the control device does not perform wireless communication.

The scanning method according to Comparative Example illustrated in (a) of FIG. 4 is different from the scanning method by control device 10, and is executed by a standard wireless communication apparatus. In the scanning method illustrated in (a) of FIG. 4, in a plurality of reception periods, the control device sequentially waits for reception in each of the communicable channels, such as channels 1, 2, . . . . After waiting for reception in channel 13 is completed, the control device again waits for reception from channel 1. The control device can wait for reception in the channels in any order. In this case, the proportion of the time to wait for reception in channel 1 in the total duration of the scanning is $\frac{1}{13}$, and the proportion of the number of times to wait for reception in channel 1 in the total duration of the scanning is $\frac{1}{13}$.

In the scanning method illustrated in (b) of FIG. 4, control device 10 sequentially waits for reception in channels 1, 2, 3, and 4 in a plurality of reception periods, and thereafter waits for reception in channel 1 as the transmission channel. Then, control device 10 sequentially waits for reception in channel 5 and thereafter. In this case, the proportion of the time to wait for reception in channel 1 in the total duration of the scanning is $\frac{1}{5}$, and is greater than $\frac{1}{13}$. The proportion of the number of times to wait for reception in channel 1 in the total duration of the scanning is $\frac{1}{5}$, and is greater than $\frac{1}{13}$.

In the scanning method illustrated in (c) of FIG. 4, control device 10 alternately waits for reception in channel 1 and the channels excluding channel 1 in a plurality of reception periods. The order of the channels excluding channel 1 can be any order. In this case, the proportion of the time to wait for reception in channel 1 in the total duration of the scanning is $\frac{1}{2}$, and is greater than $\frac{1}{13}$. The proportion of the number of times to wait for reception in channel 1 in the total duration of the scanning is $\frac{1}{2}$, and is greater than $\frac{1}{13}$.

In the scanning method illustrated in (d) of FIG. 4, control device 10 waits for reception in channel 1 for a longer time than the time to wait for reception in the channels excluding channel 1. For example, the time to wait for reception in channel 1 is set 1.5 times longer than the time to wait for reception in the channels excluding channel 1. In this case, the proportion of the time to wait for reception in channel 1 in the total duration of the scanning is 1.5/13, and is greater than $\frac{1}{13}$. The proportion of the number of times to wait for reception in channel 1 in the total duration of the scanning is equal to $\frac{1}{13}$.

In the scanning method illustrated in (e) of FIG. 4, control device 10 waits for reception in channel 1 multiple times (e.g., two times) in scanning in which control device 10 waits for reception in channel 1, 2, . . . , 13. Control device 10 waits for reception in channel 1 for a half time of the time to wait for reception in the case of (a) or the like in a first period of waiting for reception, and then waits for reception in channel 1 for a half time of the time to wait for reception in the case of (a) or the like immediately after waiting for reception in channel 4. In this case, the proportion of the time to wait for reception in channel 1 in the total duration of the scanning is equal to $1/13$. The proportion of the number of times to wait for reception in channel 1 in the total duration of the scanning is $2/13$, and is greater than $1/13$.

Thus, in the scanning by wireless IF 11, the proportion of the time or the number of times to wait for reception in the transmission channel in the total duration of the scanning is greater than $1/N$. Thereby, by receiving the beacon in channel 1, the beacon being transmitted by apparatus 30, control device 10 can find apparatus 30 that transmits the beacon in channel 1 earlier than in the case of the control device in Comparative Example. Moreover, control device 10 can receive the beacon transmitted by apparatus 30 in any channel of the communicable channels. In other words, finding of apparatus 30 which transmits the beacon in the channel other than channel 1 is not prevented.

Hereinafter, (1) processing related to the non-display-control apparatus and (2) processing related to the display-control apparatus, which are executed by control device 10, will be described.

(1) Processing Related to Non-Display-Control Apparatus

The processing related to the non-display-control apparatus to be executed by control device 10 includes processing to install software to terminal T, the software managing apparatus 30 which is a non-display-control apparatus.

Figure 5:
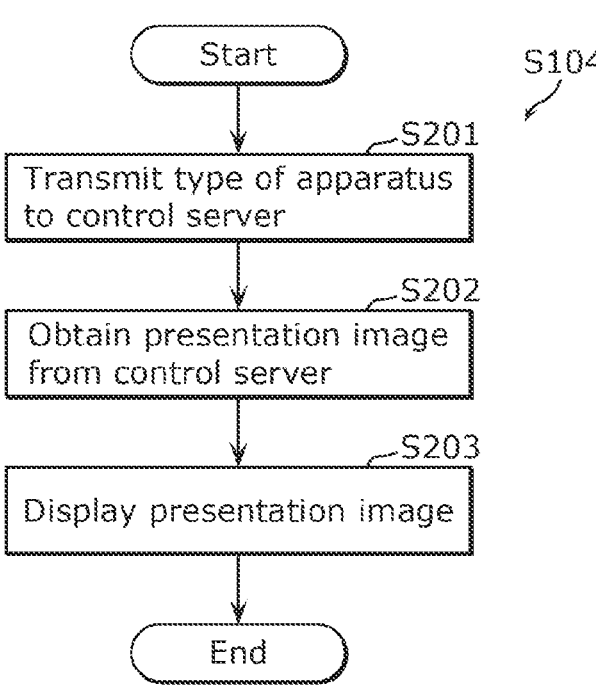
FIG. 5 is a flowchart illustrating processing related to a non-display-control apparatus, the processing being to be executed by the control device according to the embodiment.

FIG. 5 is a flowchart illustrating processing related to the non-display-control apparatus to be executed by control device 10 according to the present embodiment. The processing illustrated in FIG. 5 illustrates details of the processing included in step S104 of FIG. 3.

In step S201, display controller 13 in control device 10 transmits the type of apparatus 30 to control server 42. Control server 42 receives the type of apparatus 30. The type of apparatus 30 includes at least information indicating that apparatus 30 is a non-display-control apparatus, and may further include the class or model of apparatus 30.

In step S202, display controller 13 in control device 10 obtains a presentation image from control server 42. The presentation image to be obtained is transmitted by control server 42 that has received the type of apparatus 30 transmitted in step S201, in response to the reception. When display controller 13 transmits the class or model of apparatus 30 in step S201, the presentation image obtained in step S202 may be a presentation image prepared according to the class or model of apparatus 30.

In step S203, display controller 13 in control device 10 displays the presentation image, which is obtained in step S202, on the display screen. It is assumed that the displayed presentation image is viewed by user U.

Through a series of processing illustrated in FIG. 5, control device 10 can display the presentation image for installing software on the display screen, the software managing apparatus 30 that is a non-display-control apparatus.

Figures 6, 7:
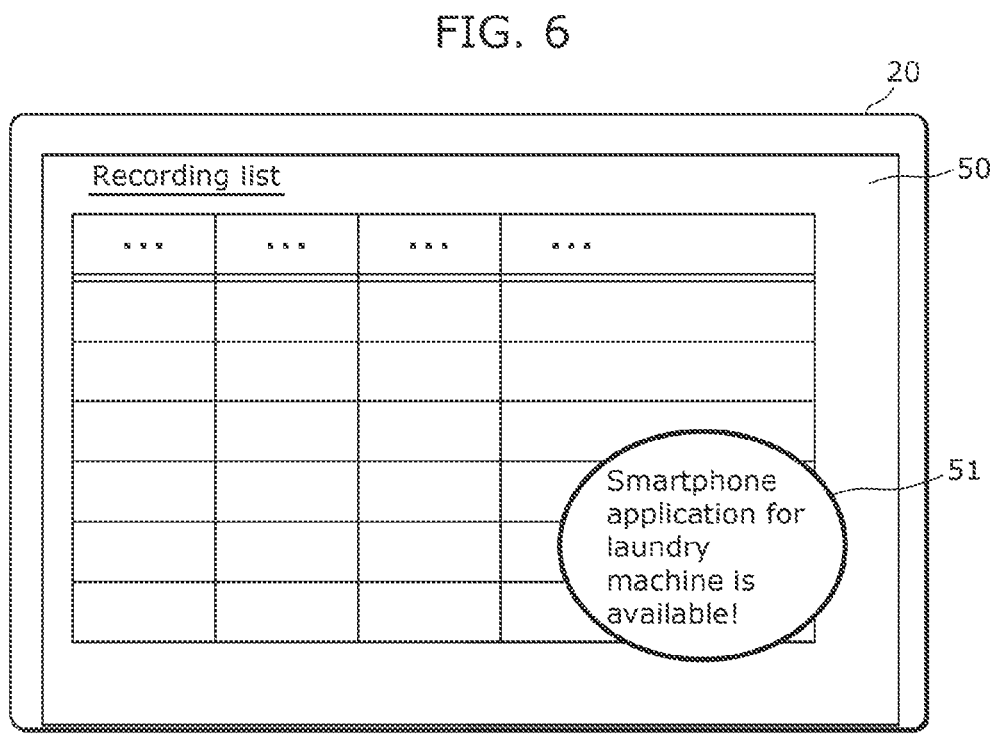
FIG. 6 is a diagram illustrating a first example of an image displayed by the control device according to the embodiment.
FIG. 7 is a diagram illustrating a second example of the image displayed by the control device according to the embodiment.

FIG. 6 is a diagram illustrating a first example of the image to be displayed by control device 10 according to the present embodiment.

Image 50 illustrated in FIG. 6 is one example of the image displayed by display device 20 by control of control device 10, and includes a list of recorded programs. Image 50 may be a different image as long as it is an image displayed in the normal operation of control device 10 that is a recording apparatus.

Image 50 includes image 51 that is a presentation image. Image 51 is one example of the information indicating that the software that manages apparatus 30 (e.g., laundry machine) and operates on terminal T can be used (or installed) in terminal T. It can also be said that image 51 is superimposed and displayed on image 50.

By viewing image 51, user U can recognize that the software that operates on terminal T can be used, which can motivate user U to install the software to terminal T.

FIG. 7 is a diagram illustrating second example of the image displayed by control device 10 according to the present embodiment.

Image 55 illustrated in FIG. 7 is one example of the image displayed by display device 20 by control of control device 10, and includes image 56 that is a presentation image including a two-dimensional code (specifically, QR code (registered trademark)) indicating the address of the site that provides the software.

The two-dimensional code in image 56 is the address of the site encoded by a predetermined encoding method, the site providing the software that operates on terminal T. Terminal T can obtain the address of the site by capturing image 56 with a camera based on an operation by user U and decoding the two-dimensional code in image 56 by a predetermined decode method, and can access to the site.

In addition to image 56, image 55 may include information indicating that connection of apparatus 30 to a network is convenient, in other words, information that motivates user U to connect apparatus 30 to the network.

Figure 8:
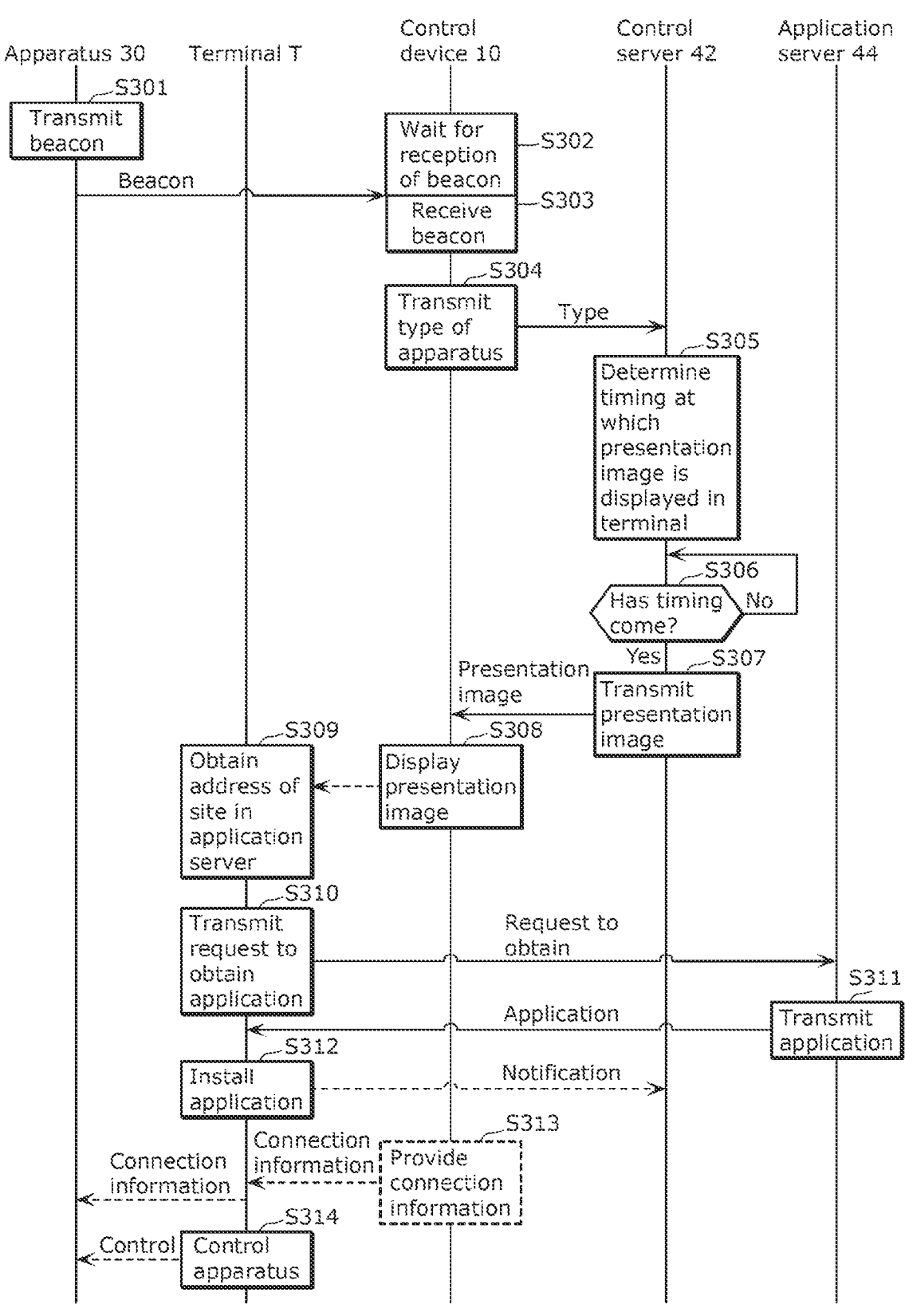
FIG. 8 is a sequence diagram illustrating processing related to the non-display-control apparatus, the processing being to be executed by the control system according to the embodiment.

FIG. 8 is a sequence diagram illustrating processing related to the non-display-control apparatus to be executed by control system 1 according to the present embodiment.

In step S301, apparatus 30 transmits a beacon. Apparatus 30 can repeatedly transmit the beacon at a predetermined time interval (e.g., an interval of 100 milliseconds). The beacon transmitted in step S301 can be one of the beacons repeatedly transmitted.

In step S302, control device 10 waits for reception of the beacon. The waiting for reception of the beacon is performed by scan of the channels (see (b) to (e) in FIG. 4).

In step S303, in waiting for reception of the beacon, control device 10 receives the beacon transmitted by apparatus 30 in step S301. Step S303 corresponds to step S101 in FIG. 3.

In step S304, control device 10 transmits the type of apparatus 30 to control server 42. The type of apparatus 30 is transmitted based on determination that the type of apparatus 30 determined by the beacon transmitted by apparatus 30 is not the display-control apparatus. Step S304 corresponds to steps S102, S103, and S104 in FIG. 3 and step S201 in FIG. 5.

In step S305, control server 42 determines the timing at which the presentation image is displayed on the display screen. The timing at which the presentation image is displayed may be any number of times as long as it is more than or equal to one time, and may be at any time. For example, it may be a timing immediately after step S304, or may be a predetermined time of day.

In step S306, control server 42 determines whether the timing determined in step S305 has come. When it is determined that the timing has come (Yes in step S306), the processing goes to step S307. When it is not the case (No in step S306), the processing goes to step S306. In other words, control server 42 waits in step S306 until the timing comes.

When a plurality of timings are determined in step S305, step S306 is executed at each of the timings. When a notification (step S312 described later) that an application is installed on terminal T is received, execution of step S306 is unnecessary at the timings thereafter.

In step S307, control server 42 transmits a presentation image to control device 10. Control device 10 receives the transmitted presentation image.

In step S308, control device 10 displays the presentation image received in step S307 on the display screen. The presentation image includes a QR code (registered trademark) in which at least the address of the site in application server 44 is encoded. It is assumed that the displayed presentation image is viewed by user U.

In step S309, terminal T obtains the address of the site in application server 44 by capturing the QR code (registered trademark) included in the presentation image based on an operation by user U who has viewed the presentation image displayed in step S308, and decoding the QR code (registered trademark).

In step S310, terminal T transmits a request to obtain the application to the address obtained in step S309. Application server 44 receives the transmitted request to obtain the application.

In step S311, in response to the request received in step S310, application server 44 transmits the application as the target of the request to terminal T. Terminal T receives or downloads the transmitted application.

In step S312, the application received in step S311 is installed on terminal T. Terminal T may transmit a notification to control server 42, the notification indicating that the application is installed. Transmission of the presentation image by control server 42 (step S307) after the notification can be stopped by the notification.

In step S313, control device 10 transmits connection information to terminal T, the connection information being used for connection of apparatus 30 to the wireless LAN. Terminal T transmits the received connection information to apparatus 30. Thereby, the connection information transmitted by control device 10 is provided to apparatus 30 through terminal T. Control device 10 may provide the connection information as it is to apparatus 30, the connection information being used for connection of apparatus 30 to the wireless LAN, or may convert the connection information according to predetermined conversion rules and provide the converted connection information to apparatus 30 (described later). Step S313 need not be executed.

In step S314, terminal T can control device 30 by operating the application installed in step S312. The information may be provided from terminal T to apparatus 30 through near-field wireless communication, or may be provided through network N when apparatus 30 is connected to wireless LAN through step S313.

The transmission and display of the presentation image in steps S307 and S308 may be performed one time or two or more times. When the presentation image is transmitted and displayed one time, image 56 illustrated in FIG. 7 is used as the presentation image in the one-time transmission and display of the presentation image. When the presentation image is transmitted and displayed two or more times, image 51 illustrated in FIG. 6 may be used as the presentation image, and when user U performs an operation on image 51, image 56 illustrated in FIG. 7 may be used as the presentation image.

The predetermined time of day to be used in step S305 can be a predicted time at which user U is not relatively busy, or can be a predicted time (e.g., 20:00) at which user U can ensure the time to install the software to terminal T. This leads to an advantage of increasing a probability that user U installs the software to terminal T using the presentation image.

Hereinafter, conversion of the control information in the processing to provide the connection information in step S313 will be described.

Generally, a wireless interface connectable to base station 40 through a wireless LAN is provided in the apparatus used in residence H. Examples of communication standards for the wireless LAN include IEEE802.11a and IEEE802.11g. IEEE802.11a has features such as a high relatively high communication rate, communication loss likely to be caused by influences from obstacles present in a communication path, and relatively high cost of the communication interface. IEEE802.11g has features such as relatively small influences from obstacles present in a communication path, relatively low cost of the communication interface, and communication loss likely to be caused by influences from radiowaves radiated by a microwave oven or the like. For example, apparatuses (such as a television and a recording apparatus) used in applications to video transmission required for a relatively high communication rate, for example, may include a communication interface for IEEE802.11a in some cases. Apparatuses (such as a laundry machine, an air conditioner, a refrigerator, and a microwave oven) used in applications where a relatively high communication rate is not required, for example, may include a communication interface for IEEE802.11g in some cases.

For this reason, in control system 1, control device 10 may include a communication interface for IEEE802.11a in some cases. Apparatus 30 may include a communication interface for IEEE802.11a in some cases when it is a television, and may include a communication interface for IEEE802.11g in some cases when it is a laundry machine.

Thus, control device 10 can switch the processing to provide the connection information according to whether the communication standard to be used by control device 10 to connect to the wireless LAN is identical to that to be used by apparatus 30 to connect to the wireless LAN.

Figures 9, 10:
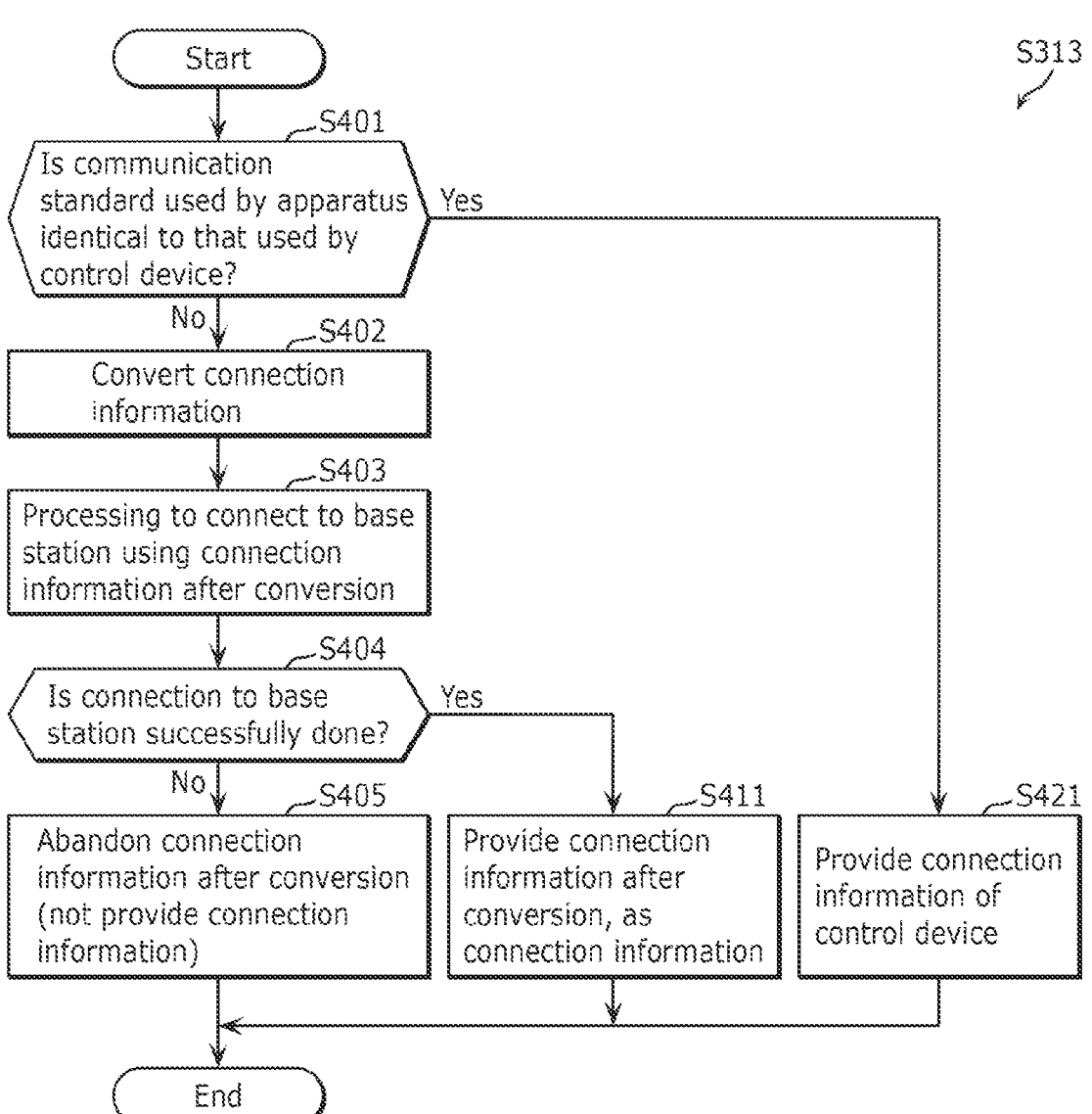
FIG. 9 is a flowchart illustrating processing to provide connection information, the processing being to be executed by the control device according to the embodiment.
FIG. 10 is a diagram illustrating an example of rules of the connection information according to the embodiment.

FIG. 9 is a flowchart illustrating the processing to provide the connection information to be executed by control device 10 according to the present embodiment.

In step S401, control device 10 determines whether the communication standard used by apparatus 30 to connect to base station 40 is identical to that used by control device 10 to connect to base station 40. When it is determined that these communication standards are identical (Yes in step S401), the processing goes to step S421, and when it is not the case (No in step S401), the processing goes to step S402. For example, when the communication standard used by apparatus 30 is IEEE802.11g and that used by control device 10 is IEEE802.11a, control device 10 determines that these communication standards are not identical. In contrast, for example, when the communication standard used by apparatus 30 and that used by control device 10 both are IEEE802.11a, control device 10 determines that these communication standards are identical. It is assumed that control device 10 preliminarily obtains the communication standard used by apparatus 30 to connect to base station 40.

In step S402, control device 10 converts the connection information. Specifically, using predetermined conversion rules, control device 10 converts the connection information used by control device 10 to connect to the wireless LAN to the connection information in the communication standard used by apparatus 30. Although the predetermined conversion rules are not always present, the predetermined conversion rules can be derived using the naming convention of the connection information of each communication standard in the initial setting of base station 4. For example, the naming convention can be determined by the manufacturer of base station 40.

Examples of naming conventions of the connection information in the communication standards will be described.

FIG. 10 is a diagram illustrating an example of naming convention of the connection information according to the present embodiment. The example in FIG. 10 illustrates four cases of correspondence between SSID in IEEE802.11a and SSID in IEEE802.11g set in identical base station 40. The symbol "*" in each position represents the same character in IEEE802.11a and IEEE802.11g.

For example, in case #1, SSID "*-A-" in IEEE802.11a corresponds to SSID "*-G-***" in IEEE802.11g. It is considered that "A" in the former comes from the final "a" of "IEEE802.11a" as the name of the communication standard, and the "G" in the latter comes from the final "g" of "IEEE802.11g" as the name of the communication standard.

In case #2, SSID "***-a" in IEEE802.11a corresponds to SSID "***-g" in IEEE802.11g. It is considered that "a" in the former and "g" in the latter come from the same origins as those in case #1.

For example, in case #3, SSID "*5 g-***" in IEEE802.11a corresponds to SSID"*2 g-*******" in IEEE802.11g. It is considered that "5 g" in the former comes from "5G" standing for 5 GHz which indicates the frequency band of IEEE802.11a, and "2 g" in the latter comes from "2G" standing for 2 GHZ (or 2.4 GHZ) which indicates the frequency band of IEEE802.11g.

In case #4, SSID "****-5 G" in IEEE802.11a corresponds to SSID "****-2 G" in IEEE802.11g. It is considered that "5 G" in the former and "2 G" in the latter come from the same origins as those in case #3.

Based on the above-mentioned naming convention for the connection information, for example, obtained is a conversion rule to obtain the SSID of IEEE802.11g by converting "a" or "A" in the SSID of IEEE802.11a to "g" or "G". A conversion rule to convert the SSID of IEEE802.11g to the SSID of IEEE802.11a is obtained by reverse conversion of the above conversion.

Moreover, a conversion rule to obtain the SSID of IEEE802.11g is obtained, for example, by converting "5 g" and "5G" in the SSID of IEEE802.11a to "2 g" and "2G", respectively. A conversion rule to convert the SSID of IEEE802.11g to the SSID of IEEE802.11a is obtained by reverse conversion of the above conversion.

Returning to FIG. 9, in step S403, control device 10 performs the processing to connect to base station 40, using the connection information after conversion in step S402. Because the predetermined conversion rules used in step S402 cannot be always used, control device 10 performs in order to inspect whether control device 10 can actually connect to base station 40 using the connection information after conversion.

In step S404, control device 10 determines whether control device 10 is actually successfully connected to base station 40 in the processing of step S403. When it is determined that control device 10 is actually successfully connected (Yes in step S404), the processing goes to step S411, and when it is not the case (No in step S404), the processing goes to step S405.

In step S405, control device 10 abandons the connection information after conversion in step S402.

In step S411, control device 10 provides the connection information after conversion in step S402 to apparatus 30 as the connection information used by apparatus 30 to connect to base station 40.

In step S421, control device 10 provides the connection information which control device 10 currently uses to connect to base station 40, to apparatus 30 as the connection information used by apparatus 30 to connect to base station 40.

After step S405, S411, or S421 is completed, a series of processings illustrated in FIG. 9 is terminated.

As described above, control device 10 can perform the processing to install the software for managing apparatus 30 that is a non-display-control apparatus, to terminal T.

(2) Processing Related to Display-Control Apparatus

The processing related to the display-control apparatus to be executed by control device 10 includes processing to provide the connection information to apparatus 30 that is a display-control apparatus.

Figure 11:
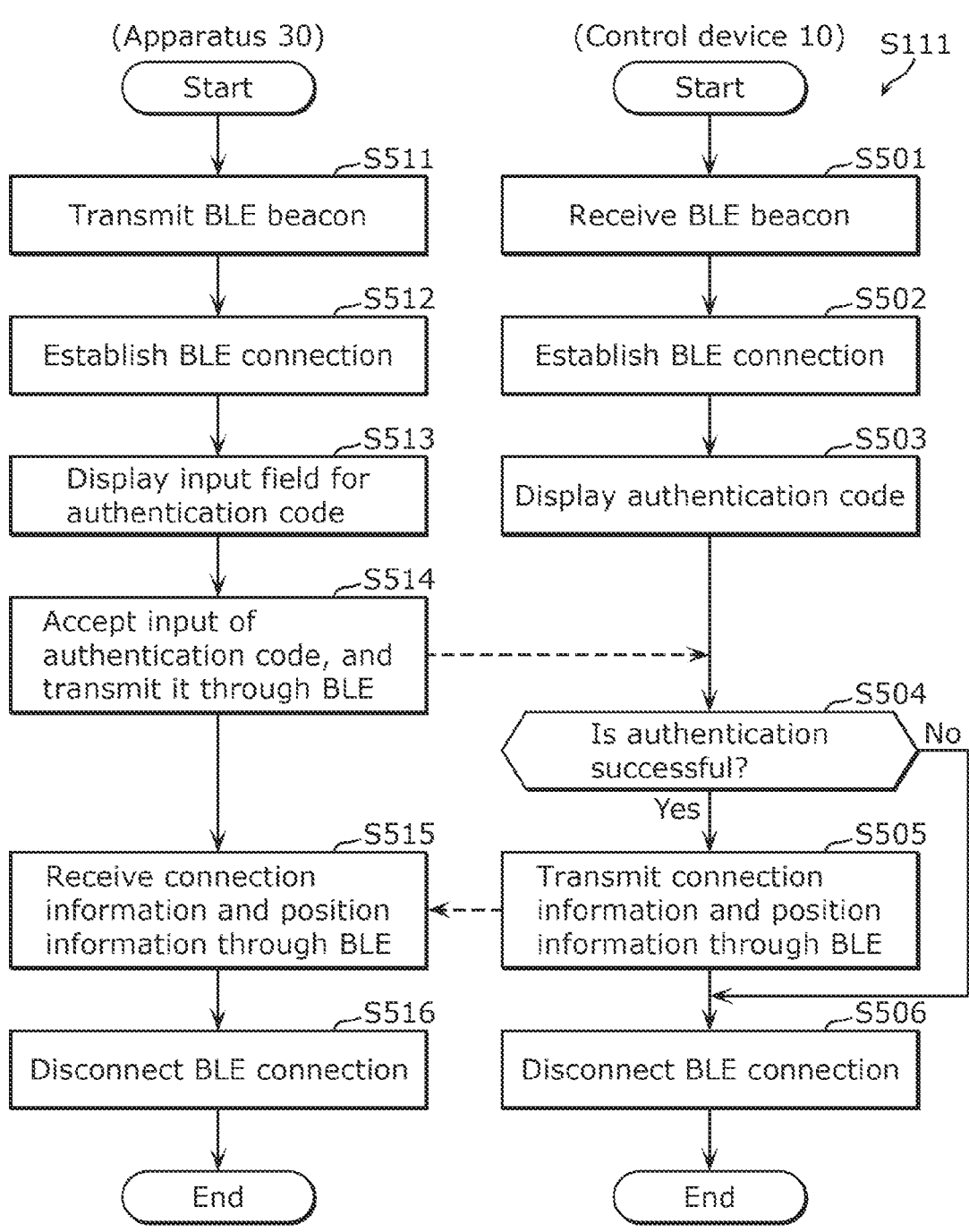
FIG. 11 is a flowchart illustrating processing related to a display-control apparatus, the processing being to be executed by the control device according to the embodiment.

FIG. 11 is a flowchart illustrating the processing related to the display-control apparatus to be executed by control device 10 according to the present embodiment. The processing illustrated in FIG. 11 illustrates details of the processing included in step S111 of FIG. 3. FIG. 11 also illustrates the processing by apparatus 30 as well as the processing by control device 10.

The processing illustrated in FIG. 11 is processing to provide setting information needed for operation of apparatus 30 from control device 10 to apparatus 30 when control device 10 performs authentication of apparatus 30 and the authentication is successfully done. Control device 10 can transfer the setting information to apparatus 30 through the above-mentioned processing. For example, the setting information includes connection information for wireless IF 11 of apparatus 30 to connect to the wireless LAN and position information to be set in apparatus 30. This case will be described as one example, but any other configuration can be used.

In step S501, control device 10 receives a BLE beacon. It is assumed that the received BLE beacon is transmitted by apparatus 30 (step S511).

In step S502, control device 10 establishes BLE connection to apparatus 30 using ID information of apparatus 30 included in the BLE beacon received in step S501 (step S512).

In step S503, control device 10 displays an authentication code on the display screen. It is assumed that the displayed authentication code is viewed by user U of apparatus 30.

At this time, in step S513, apparatus 30 displays an input field for the authentication code. It is assumed that user U who has viewed the authentication code displayed in step S503 inputs the authentication code to the input field displayed in step S513. Apparatus 30 accepts the input of the authentication code from user U, and transmits the accepted authentication code to control device 10 (step S514). Control device 10 receives the transmitted authentication code.

In step S504, control device 10 authenticates apparatus 30 using the authentication code displayed in step S503 and the authentication code received in step S514. For example, control device 10 determines whether the authentication code displayed in step S503 matches with the authentication code received in step S514. When it is determined that these authentication codes match with each other, the authentication of apparatus 30 is successfully done. When it is determined that these authentication codes do not match, the authentication of apparatus 30 is failed. When the authentication is successfully done (Yes in step S504), the processing goes to step S505. When it is not the case (No in step S504), the processing goes to step S506.

In step S505, control device 10 transmits the information for wireless IF 11 of apparatus 30 to connect to the wireless LAN and the position information to be set in apparatus 30 to apparatus 30 through BLE. Apparatus 30 receives the connection information and position information transmitted (step S515).

For example, the connection information can include the SSID of Wi-Fi as the wireless LAN and the password for connection. The position information can include a zip code or position information in a different format.

In step S506, control device 10 disconnects the BLE connection to apparatus 30 (step S516).

The information needed for the operation of apparatus 30 can be provided from control device 10 to apparatus 30 by a series of processings illustrated in FIG. 11 through viewing and input of the authentication code by user U.

Next, two cases of the configuration of display of the authentication code and display of the input field for the authentication code will be described as examples.

Figure 12:
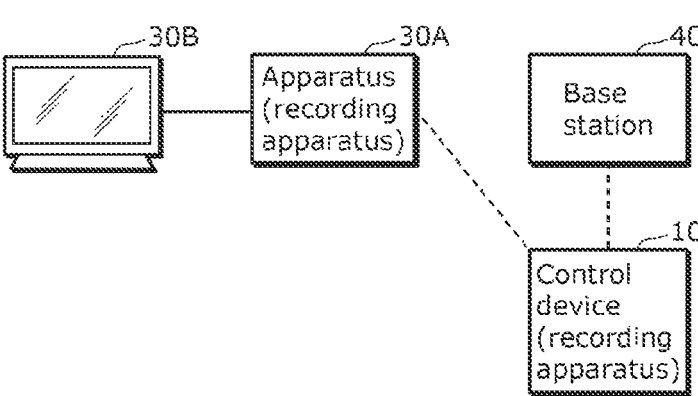
FIG. 12 is a diagram illustrating a first example of the configuration of the control device and the apparatus according to the embodiment.
Figure 13:
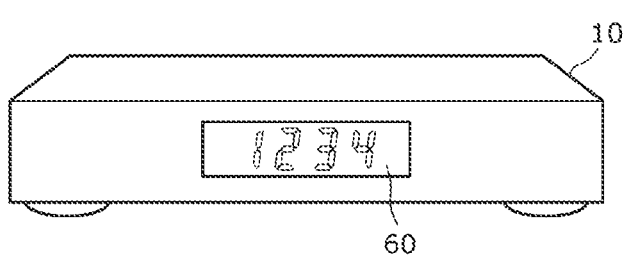
FIG. 13 is a diagram illustrating an authentication code displayed by the control device in the configuration illustrated in FIG. 12.
Figure 14:
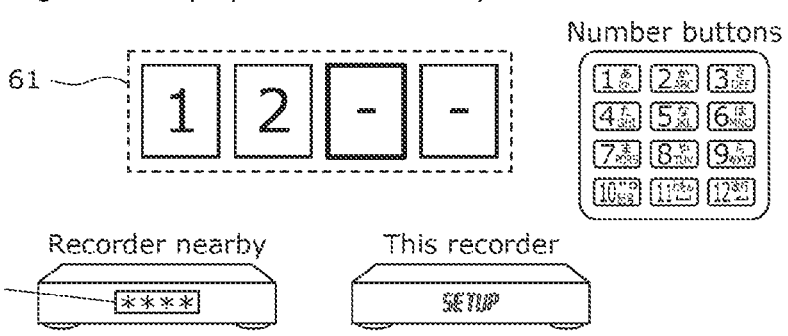
FIG. 14 is a diagram illustrating an image displayed by the apparatus in the configuration illustrated in FIG. 12.

(a) Case where Control Device 10 is Recording Apparatus and Apparatus 30 is Recording Apparatus FIG. 12 is a diagram illustrating a first example of the configuration of control device 10 and apparatus 30 according to the present embodiment. FIG. 13 is a diagram illustrating the authentication code displayed by control device 10 in the configuration illustrated in FIG. 12. FIG. 14 is a diagram illustrating an image displayed by apparatus 30 in the configuration illustrated in FIG. 12.

In this configuration, control device 10 is a recording apparatus and apparatus 30A as apparatus 30 is a recording apparatus. The recording apparatus as apparatus 30A is connected to television 30B by a video communication standard (e.g., HDMI (registered trademark)). Television 30B receives a video signal, which is transmitted by apparatus 30A, in an external input mode, and displays an image.

In this configuration, as illustrated in FIG. 13, the recording apparatus as control device 10 displays authentication code 60 (here, "1234") in the display window provided in the recording apparatus (step S503). Apparatus 30A displays input field 61 for the authentication code in television 30B (step S513).

It is assumed that after viewing authentication code 60 displayed, user U inputs the authentication code to the input field displayed in television 30B by operating apparatus 30A.

Figure 15:
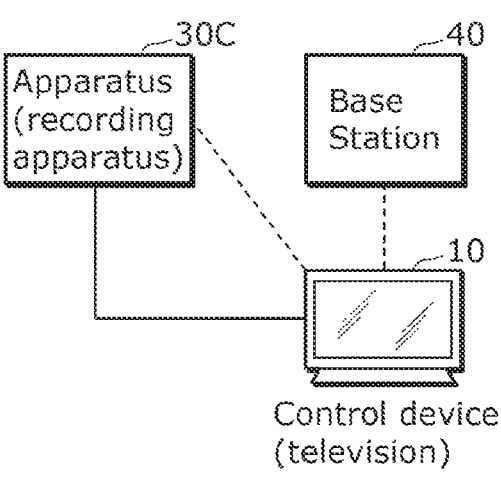
FIG. 15 is a diagram illustrating a second example of the configuration of the control device and the apparatus according to the embodiment.
Figure 16:
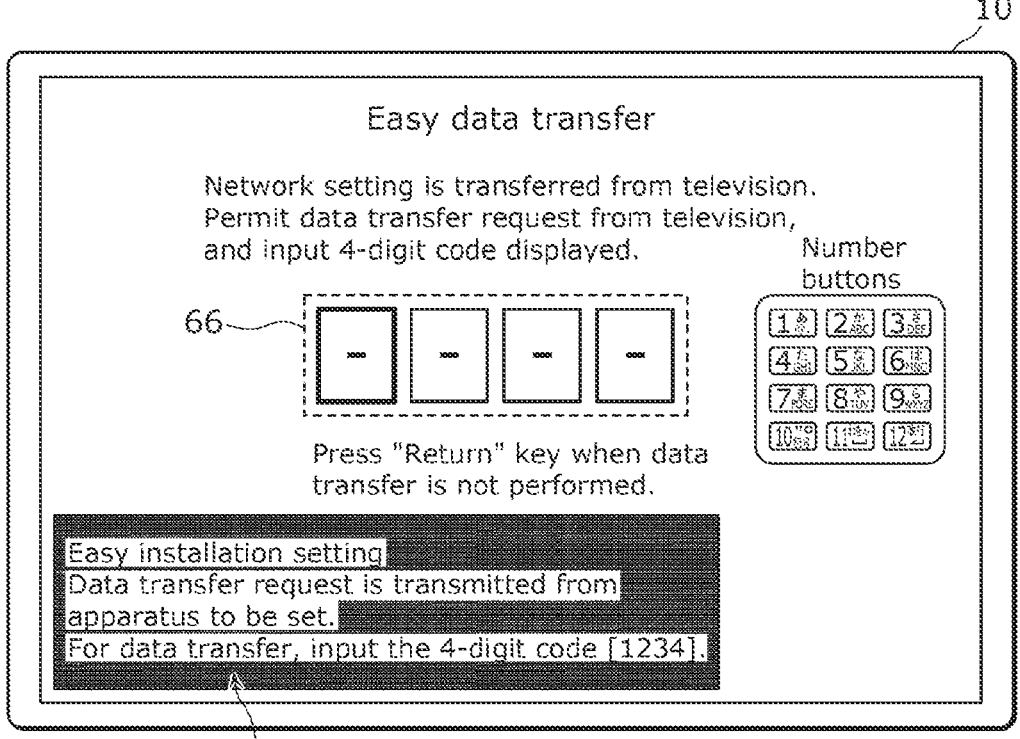
FIG. 16 is a diagram illustrating an image displayed by the display device in the configuration illustrated in FIG. 15.

(b) Case where Control Device 10 is Display Device and Apparatus 30 is Recording Apparatus FIG. 15 is a diagram illustrating a second example of the configuration of control device 10 and apparatus 30 according to the embodiment. FIG. 16 is a diagram illustrating an image displayed by a display device as control device 10 in the configuration illustrated in FIG. 15.

In this configuration, control device 10 is a television, and apparatus 30C as apparatus 30 is a recording apparatus. The recording apparatus as apparatus 30C is connected to the television as control device 10 by a video communication standard (e.g., HDMI (registered trademark)). Television as control device 10 receives the video signal transmitted by apparatus 30C in an external input mode, and displays the image.

In this configuration, as illustrated in FIG. 16, the television as control device 10 displays authentication code 65 (here, "1234") on the display screen provided in the television (step S503). Apparatus 30C displays input field 66 for the authentication code on the display screen of television as control device 10 (step S513).

At this time, authentication code 65 and input field 66 are displayed on the same display screen.

In this case, the television as control device 10 displays information needed for authentication as on-screen display (OSD). Apparatus 30C displays the information needed for authentication in a position of the display screen of the television as control device 10 excluding a predetermined position where OSD is displayed. In such a configuration, user U can view input field 66 for the authentication code displayed by apparatus 30C and authentication code 65 displayed by the television as control device 10 one time, thus avoiding covering of one of these with the other so that user U cannot view it.

In the above configuration, one example of the information needed for authentication of the apparatus, which is displayed by control device 10, is authentication code 65, and one example of the information needed for authentication of the apparatus, which is displayed by apparatus 30C, is input field 66 for the authentication code.

It is assumed that after viewing authentication code 60 displayed, user U inputs the authentication code to the input field displayed in the television by operating apparatus 30C.

By displaying the authentication code illustrated in (a) or (b) above and displaying the input field for the authentication code, control device 10 and apparatus 30 appropriately accept the input of the authentication code by user U.

Figure 17:
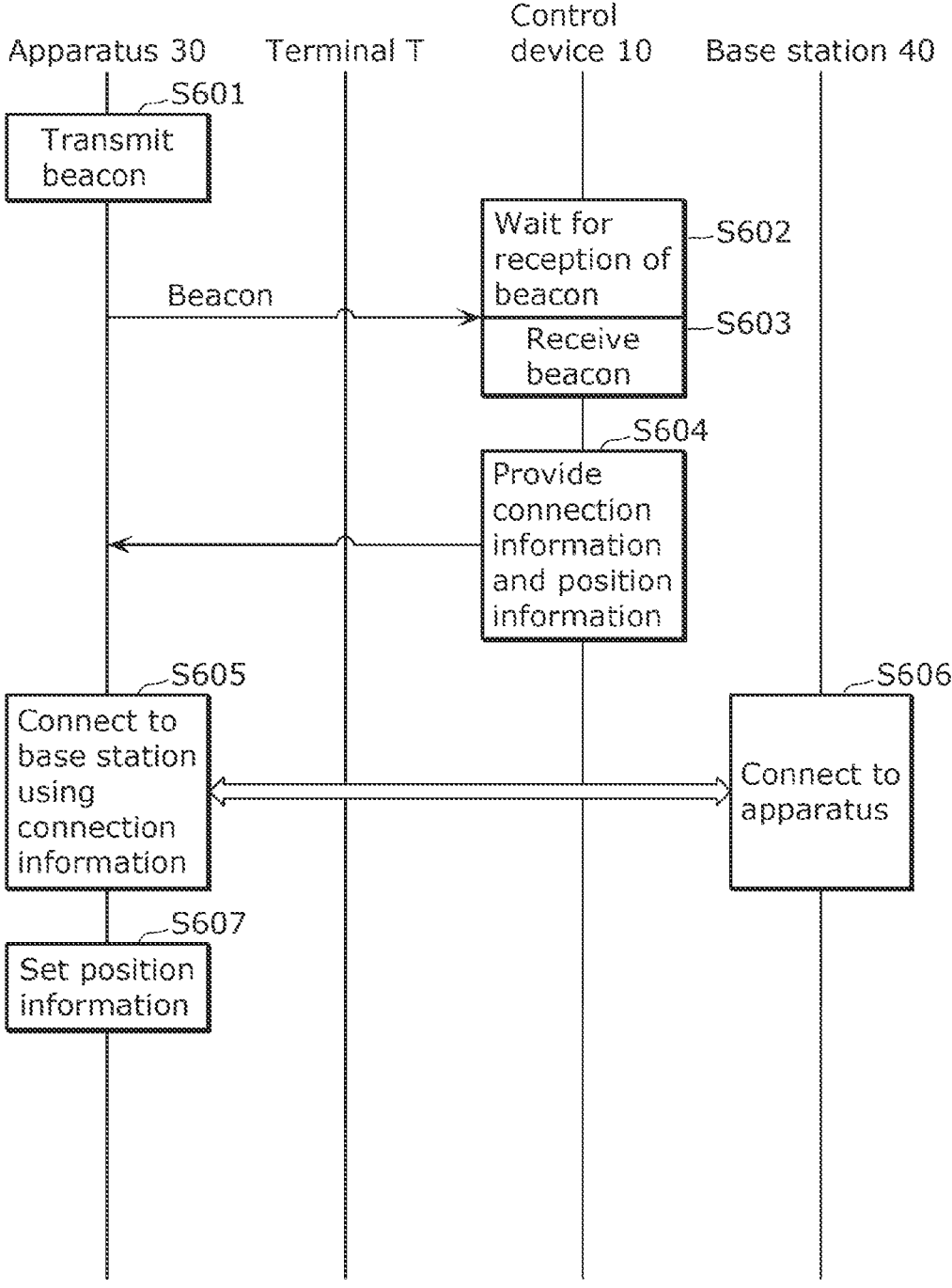
FIG. 17 is a sequence diagram illustrating processing related to a display-control apparatus, the processing being to be executed by the control device according to the embodiment.

FIG. 17 is a sequence diagram illustrating processing related to the display-control apparatus to be executed by control system 1 according to the present embodiment.

Steps S601 to S603 are the same as steps S301 to S303 illustrated in FIG. 8.

In step S604, control device 10 provides the connection information and the position information to apparatus 30. The detailed processing of step S604 corresponds to steps S501 to S506 illustrated in FIG. 11. Apparatus 30 obtains the provided connection information and position information.

In step S605, apparatus 30 connects to base station 40 using the connection information obtained in step S604 (step S606). Thereby, apparatus 30 is connected to network N through base station 40 to be communicable with another apparatus connected to network N.

In step S607, apparatus 30 sets the position information. The set position information can be used in search for a broadcast station which the television receives.

Thus, control device 10 can provide the information needed for the operation of apparatus 30 to apparatus 30 as the display-control apparatus.

Although control device 10 is a recording apparatus as one example in the above embodiment, terminal T may have the function of control device 10. In this case, because terminal T directly obtains the address of the site which provides the software from control server 42, terminal T need not display an image indicating the address of such a site or read out such an image. Accordingly, such a configuration can more simply promote installation of the software managing the apparatus to the terminal. In this case, terminal T also directly performs the processing (step S313) to provide the connection information for connection to the wireless LAN to apparatus 30.

As described above, by controlling the display of the image, the control device according to the present embodiment causes the user of the terminal to recognize that the software managing the apparatus can be installed on the terminal. Thereby, the user can be motivated to install the software managing the apparatus to the terminal, and perform the installation. Thus, the control device can promote installation of the software managing the apparatus to the terminal.

Moreover, the control device can cause the user to easily recognize that the software can be installed, by controlling the display of the image indicating the notification information, or can cause the terminal to easily access to the site by controlling the display of the image indicating the address of the site that provides the software. Thus, the control device can further promote installation of the software managing the apparatus to the terminal.

Moreover, by reading the image, the terminal can know the address of the site that provides the software, and as a result, can more easily access to the site. In other words, the control device can cause the terminal to more easily access to the site. Thus, the control device can further promote installation of the software managing the apparatus to the terminal.

Moreover, the control device can cause the user to more easily view the displayed image by displaying the image on the display screen included in the control device or on the display screen included in the display device connected to the control device. Thereby, the user can be motivated to install the software managing the apparatus to the terminal. Thereby, the control device can more easily promote installation of the software managing the apparatus to the terminal.

Moreover, when the apparatus is the non-display-control apparatus, the control device causes the user to recognize that the software managing the apparatus can be installed on the terminal. When the apparatus is the non-display-control apparatus, convenience in management of the apparatus can be improved by displaying the state of the apparatus in the terminal or by adjusting the information to be set in the apparatus on the terminal and then providing the information to the apparatus. Thus, the control device can promote installation of the software managing the non-display-control apparatus to the terminal.

Moreover, the control device can cause the apparatus to connect to the base station by providing the connection information, which is used by the control device to connect to the base station, to the apparatus. Thus, the apparatus can be easily caused to connect to the base station without separately setting the connection information for the apparatus, and the apparatus can be managed through wireless communication. Thus, the control device can promote installation of the software managing the apparatus to the terminal, and further can manage the apparatus using wireless communication.

Moreover, the control device can cause the apparatus to connect to the base station by providing the connection information, which is used by the control device to connect to the base station, to the apparatus. Thereby, when the communication standard of the wireless communication used by the control device to connect to the base station is different from that of the wireless communication used by the apparatus to connect to the base station, the apparatus can be caused to easily connect to the base station without separately setting the connection information for the apparatus, and the apparatus can be managed through wireless communication. Thus, the control device can promote installation of the software managing the apparatus to the terminal, and further can manage the apparatus using wireless communication.

Moreover, the control device can identify the apparatus using the information included in the SSID included in the beacon signal in the wireless LAN or in the beacon signal included in the BLE network as the identification signal of the apparatus. In other words, use of other information is unnecessary to identify the apparatus. Thus, the control device can identify the apparatus using the beacon signal, and can promote installation of the software managing the apparatus to the terminal.

As above, the embodiment has been described as examples of the technique according to the present disclosure. For this purpose, the accompanying drawings and the detailed description have been provided.

Accordingly, in order to illustrate the above implementation, the components described in the accompanying drawings and the detailed description can include not only components essential for solving the problem, but also those not those not essential for solving the problem. For this reason, these non-essential components should not be immediately recognized as essential components because those non-essential components are described in the attached drawings and the detailed description.

Because the above-mentioned embodiment is for illustrating the technique according to the present disclosure, the embodiment can be subjected to various modification, replacement, addition, and omission without departing from the scope of CLAIMS or its equivalents.

INDUSTRIAL APPLICABILITY

The present disclosure can be used in control devices that promote installation of software managing apparatuses to terminals.

REFERENCE SIGNS LIST

1 control system
10 control device
11 wireless IF
12 obtainer
13 display controller
14 provider
20 display device
30, 30A, 30C apparatus
30B television
40 base station
42 control server
44 application server
50, 51, 55, 56 image
60, 65 authentication code
61, 66 input field
H residence
N network
T terminal
U user

The invention claimed is:

1. A control device comprising:
a first wireless interface that receives an identification signal wirelessly transmitted by an apparatus;
an obtainer that refers to the identification signal received by the first wireless interface, and obtains information indicating that software that manages the apparatus and operates on a terminal can be installed on the terminal; and
a display controller that controls display of an image indicating the information obtained by the obtainer, wherein:
the identification signal includes type information indicating a type of the apparatus,

US 12,635,010 B2

21 the obtainer obtains the information when the type information indicates that the apparatus is a non-display-control apparatus,
the display controller controls the display of the image when the type information indicates that the apparatus is the non-display-control apparatus, and
the non-display-control apparatus is an apparatus that is neither an apparatus including a display device nor an apparatus that is connected to a display device and displays an image on a display screen included in the display device.

2. The control device according to claim 1, wherein the information includes notification information indicating that the software can be installed on the terminal, or an address of a site that provides the software.

3. The control device according to claim 1, wherein the information includes an image readable by the terminal, the image indicating an address of a site that provides the software.

4. The control device according to claim 1, wherein the display controller:
(a) controls the display of the image on a display screen included in the control device; or
(b) controls the display of the image on a display screen included in a display device connected to the control device.

5. The control device according to claim 1, wherein the first wireless interface is communicably connected to a base station, and
the control device further comprises:
a provider that provides connection information to the apparatus through the terminal by providing the connection information to the terminal in which the software is installed, the connection information being connection information for the first wireless interface to connect to the base station and being set in the first wireless interface.

6. The control device according to claim 5, wherein the provider:
converts the connection information to connection information in a communication standard of a second wireless interface included in the apparatus according to predetermined conversion rules;
sets the connection information after conversion, in the first wireless interface, and determines whether the first wireless interface in which the connection information is set is successfully connected to the base station; and
provides the connection information after conversion to the apparatus when it is determined that the first wireless interface is successfully connected to the base station.

7. The control device according to claim 1, wherein the first wireless interface:
receives the identification signal as a service set identifier (SSID) included in a beacon signal in a wireless LAN, or
receives the identification signal as information included in a beacon signal in a Bluetooth Low Energy (BLE) network.

8. A terminal comprising a control device, wherein the control device includes:
a first wireless interface that receives an identification signal wirelessly transmitted by an apparatus; and
an obtainer that refers to the identification signal received by the first wireless interface, and obtains information indicating that software that manages the apparatus and operates on the terminal can be installed on the terminal,
the identification signal includes type information indicating a type of the apparatus,
the obtainer obtains the information when the type information indicates that the apparatus is a non-display-control apparatus,
display of an image indicating the information obtained by the obtainer is controlled when the type information indicates that the apparatus is the non-display-control apparatus, and
the non-display-control apparatus is an apparatus that is neither an apparatus including a display device nor an apparatus that is connected to a display device and displays an image on a display screen included in the display device.

9. The terminal according to claim 8, wherein the first wireless interface is communicably connected to a base station, and
the control device further includes a provider that provides connection information to the apparatus, the connection information being connection information for the first wireless interface to connect to the base station and being set in the first wireless interface.

10. The terminal according to claim 9, wherein the provider:
converts the connection information to connection information in a communication standard of a second wireless interface included in the apparatus, according to predetermined conversion rules;
sets the connection information after conversion, in the first wireless interface, and determines whether the first wireless interface in which the connection information is set is successfully connected to the base station; and
provides the connection information after conversion to the apparatus when it is determined that the first wireless interface is successfully connected to the base station.

11. A control method to be executed by a control device including a first wireless interface, the control method comprising:
receiving an identification signal wirelessly transmitted by an apparatus in the first wireless interface;
referring to the identification signal received in the first wireless interface, and obtaining information indicating that software that manages the apparatus and operates on a terminal can be installed on the terminal; and
controlling display of an image indicating the information obtained, wherein:
the identification signal includes type information indicating a type of the apparatus,
the obtaining comprises obtaining the information when the type information indicates that the apparatus is a non-display-control apparatus,
the controlling comprises controlling the display of the image when the type information indicates that the apparatus is the non-display-control apparatus, and
the non-display-control apparatus is an apparatus that is neither an apparatus including a display device nor an apparatus that is connected to a display device and displays an image on a display screen included in the display device.

12. A non-transitory computer-readable recording medium having recorded thereon a program for causing a computer of the control method according to claim 11.

\* \* \* \* \*